Dec. 17, 1968   D. RIEL   3,416,497
TIMER-CONTROLLED FEEDER
Filed Sept. 8, 1966
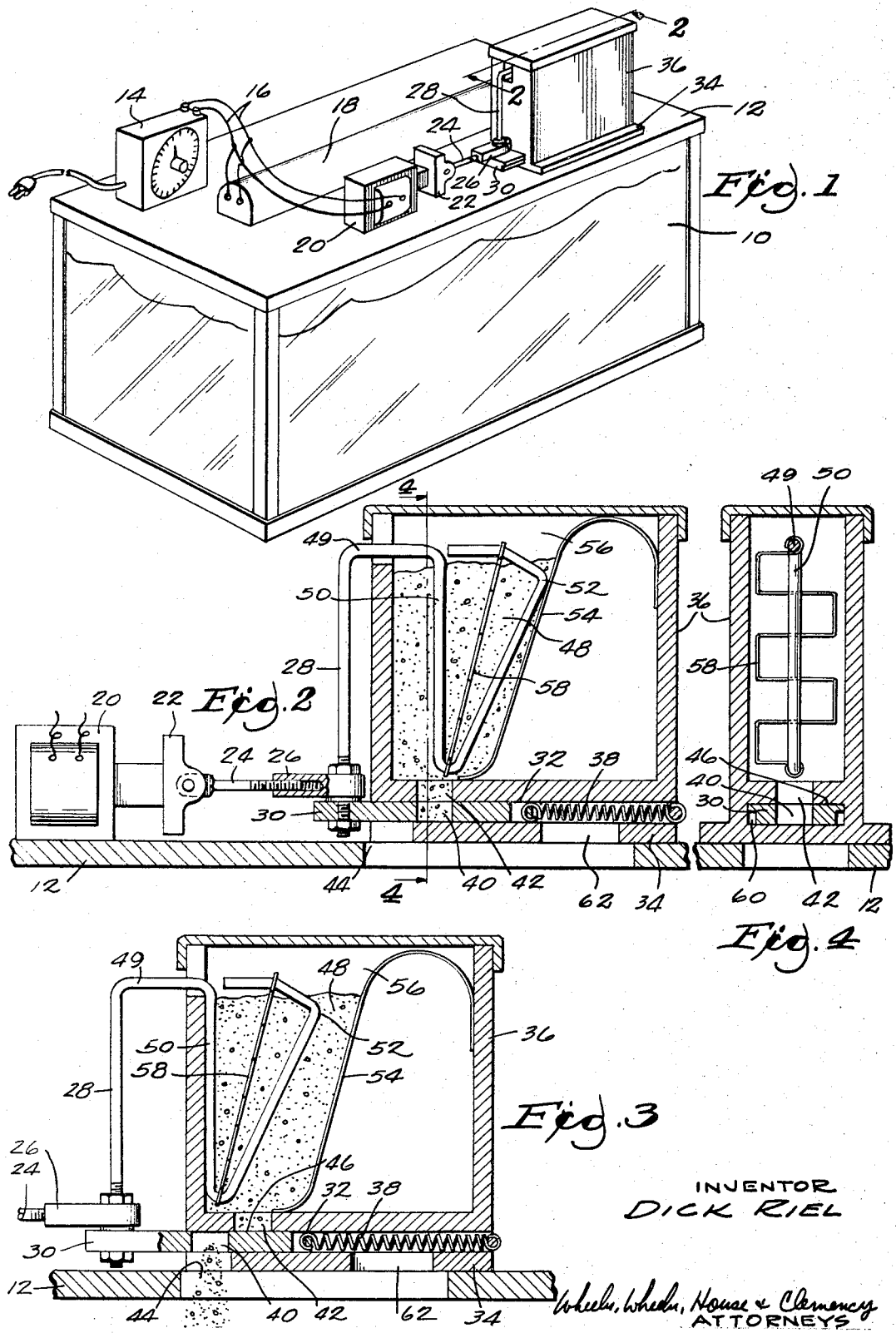
INVENTOR
DICK RIEL
Wheeler, Wheeler, House & Clemency
ATTORNEYS United States Patent Office 3,416,497
Patented Dec. 17, 1968

3,416,497
TIMER-CONTROLLED FEEDER
Dick Riel, Box 203, Oakfield, Wis. 53065
Filed Sept. 8, 1966, Ser. No. 578,011
6 Claims. (Cl. 119—51.11)

ABSTRACT OF THE DISCLOSURE

The invention is not limited to the delivery of any specific kind of food. However, the disclosure concerns delivery of fish food into an aquarium as a means of exemplifying the invention. A timer-controlled solenoid periodically shifts a slide valve for a distance which may be varied to deliver a predetermined quantity of fish food into an aquarium. Supplying the valve is a hopper having a flexible wall which is jarred in the course of operation of the solenoid, the objective being to preclude bridging of the feed across the valve opening. Means is also provided to relieve any tendency of food or other foreign matter to accumulate in the way along which the slide valve is operable.

---

Preferably, the timer and solenoid and hopper and slide valve are all mounted on the aquarium cover through which the feed is periodically discharged into the aquarium. When the solenoid is deenergized, an opening in the slide valve registers to a controlled degree with an opening in the bottom of the hopper to receive a metered quantity of feed. When the solenoid is energized, the slide port moves out of registry with the hopper opening and registers with a port in the aquarium cover to discharge its contents into the aquarium. The solenoid design is such that the solenoid may continue to be energized for a period of hours, according to the timer setting, without damage either to the solenoid or the timer. Preferably, a lamp for the illumination of the aquarium is simultaneously energized. At the conclusion of the stated period, the solenoid is deenergized and the lamp extinguished and a spring returns the slide valve to its original position where it receives another charge of feed from the hopper.

Connected with the slide valve is an arm which extends into the hopper and carries within the hopper a stirring device and also an arm extension which strikes the flexible wall of the hopper. Both the stirring device and the vibration of the flexible wall tend to discourage bridging.

Background of the invention

Aquarium feeders are well-known. The closest patent references known to me are as follows: 2,772,659, Dec. 4, 1956; 2,800,256, July 23, 1957; and 3,029,790, April 16, 1962.

The objective of the instant device is to assure accuracy of feeding by the stirring and hopper wall vibrator above mentioned and thereby to enable the adjustment of the slide valve to control with precision the amount of feed delivered. Normally, the solenoid will be energized but once a day and will maintain the lamp energized for the entire period for which the aquarium is normally viewed. It is desirable upon the deenergization of the solenoid and the return of the slide valve port to its feed receiving position that the agitation of the feed within the hopper and the vibration of the hopper wall are made to occur.

Description of the invention

FIG. 1 is a view in perspective of a diagrammatically shown exemplification of the invention.

FIG. 2 is an enlarged detail view in longitudinal section on the line 2—2 of FIG. 1.

FIG. 3 is a fragmentary view similar to FIG. 2 showing the parts in the position assumed when the solenoid is energized.

FIG. 4 is a detail view taken in section on the line 4—4 of FIG. 2.

In the device diagrammatically shown to exemplify the invention, the aquarium tank 10 is assumed to contain water in which there are fish requiring to be fed. A cover 12 for the tank confines the fish and supports the feeding and illuminating mechanism. The parts will not necessarily be in the positions in which they are illustrated for convenience. The timer 14 has electrical connections 16 to a lamp 18 and a solenoid 20. The solenoid armature 22 carries an eyebolt 24 which is threadedly adjustable in a fitting 26 attached by means of bracket 28 to the slide valve 30.

The slide valve 30 is reciprocable in a way 32 provided in the base 34 of the feed hopper 36. A tension spring 38 biases the slide valve 30 to the retracted position in FIG. 2 wherein its port 40 registers with a port 42 in the bottom of hopper 36 when the solenoid is deenergized. The exact extent of registry is determined by adjusting the eyebolt 24 in the fitting 26.

When the solenoid 20 is energized, the armature 22 draws the slide valve 30 against the bias of spring 38 to the advanced position shown in FIG. 3 wherein the port 40 no longer registers with port 42 but, instead, discharges its content of feed into the aquarium through the slot 44 in the cover 12.

Meantime, the top surface 46 of the slide valve 40 has closed the port 42. The solenoid may remain energized for a period of hours, during which time the lamp 18 is also energized. Throughout this period, the port 42 in the bottom of hopper 36 remains closed. There may be some tendency for the feed 48 in the hopper to bridge across the port 42.

When the solenoid is deenergized by timer 14, the spring 38 will draw the slide 30 sharply to its retracted position as shown in FIG. 2. In so doing, it will destroy any bridging of the feed within the hopper. For this purpose, the bracket 28 has an arm 49 that extends into the hopper and downwardly at 50 to a point near the port 42. Thence the arm extends upwardly and outwardly to an apex 52 which is so positioned as to engage in the retracted position of the slide valve, a flexible wall 54 with which the hopper 36 is provided and which defines the chamber 56 in which the feed 48 is disposed. This wall is resiliently flexible and may be made of any appropriate material such as spring steel or spring bronze or sheet plastic. It not only yields but tends to vibrate when struck sharply by the apex 52 of arm 49 upon retraction of the slide by the bias of spring 38. This dislodges the feed 48. Further loosening is effected by means of a stirring device 58 carried by the arm within the chamber 56 of hopper 36.

To prevent any sticking of the slide 30, the side margins thereof are preferably relieved at 60 immediately below the top surface 46 which constitutes the valve. Consequently, the thinness of the top surface leaves very little side area in which feed can wedge. Any feed escaping laterally across the top surface 46 will drop through the relieved areas 60 into the aquarium. Similarly, the base 34 of the hopper is cut away at 62 so that any feed trapped behind the slide may be forced through the relief port 62 into the aquarium.

As noted, it is deemed desirable that the timer needs to operate at infrequent intervals—usually closing the solenoid and lamp circuits only once a day and opening them several hours later. In such a device, the stirrer 58 and the flexible wall 54 struck by the apex 52 of arm 49 are of significant advantage in preventing bridging. It will further be noted that the antibridging operation occurs at the precise time when the slide valve port 40 is to be recharged from the hopper.

I claim:
1. An automatic feeder including the combination of a slide having a downwardly opening valve pocket, means providing a way in which the slide is reciprocable between loading and discharge positions, said means having a bottom providing a closure for the pocket in its loading position and having a discharge port with which the pocket communicates in its discharge position, means for moving the slide in the way between said positions a hopper for delivering feed to the pocket in the loading position of the slide, means for agitating material in the hopper, and means for actuating the agitating means upon the occurrence of movement of the slide, the means for agitating material in the hopper including a flexible wall at one side of the hopper and the slide having an arm extending into the hopper and engageable with said wall for flexing the same as the slide moves toward its loading position.

2. A feeder according to claim 1 in which said arm has stirring devices attached thereto as a further means of agitating feed in the hopper.

3. A feeder according to claim 1 in which the slide has a top surface constituting a valve for closing the upwardly opening port when said slide is advanced to register its pocket with the discharge port, said slide having side marginal portions relieved to be spaced from adjacent portions of said way below the top surface, said way having means for the discharge of feed reaching the space between the relieved side portions of the slide and the adjacent portions of the way.

4. A feeder according to claim 3 in which said relieved marginal portions are at the lower surface of the slide, reducing the thickness of the slide below the top surface thereof constituting said valve.

5. An automatic feeder for fish in an aquarium, said feeder comprising a cover for the aquarium, a light mounted on the cover, a timer having operative connections for energizing the light, a solenoid mounted on the cover and having operative connections from said timer for the energization of the solenoid, a hopper mounted on the cover and having a base providing a way, said base having a charging port communicating with the way and having an offset discharge port leading through the cover from the way into the aquarium, a slide reciprocable along said way between charging and discharging positions and provided with a pocket communicating with the respective ports in the respective positions, said solenoid having an armature with an operative connection to said slide for the movement thereof in one direction along said way, means connected with the slide for the movement thereof in the opposite direction along said way, and means connected with said slide for the agitation of feed in the hopper when the slide moves in the way, the hopper including a flexible wall, and said agitating means including a portion for striking said wall to preclude bridging in the hopper across the charging port.

6. A feeder according to claim 5 in which said agitating means functions as the slide approaches said charging position in which its pocket communicates with the charging port of the hopper.

References Cited

UNITED STATES PATENTS

| | | | |
|---|---|---|---|
| 1,320,250 | 10/1919 | Llewellyn | 222—245 |
| 2,782,962 | 2/1957 | Mercer | 222—333 X |
| 2,800,256 | 7/1957 | Di Nuzzo | 222—333 |
| 2,858,799 | 11/1958 | Krauss et al. | 119—5 |

FOREIGN PATENTS 673,806   11/1963   Canada.

HUGH R. CHAMBLEE, *Primary Examiner.*

U.S. Cl. X.R.

222—333